United States Patent
Drasovean

(10) Patent No.: US 10,037,023 B2
(45) Date of Patent: Jul. 31, 2018

(54) DYNAMIC REPAIR SYSTEM

(71) Applicant: Toyota Motor Engineering & Manufacturing North America, Inc., Erlanger, KY (US)

(72) Inventor: Leontin Drasovean, London (CA)

(73) Assignee: Toyota Motor Engineering & Manufacturing North America, Inc., Plano, TX (US)

( * ) Notice: Subject to any disclaimer, the term of this patent is extended or adjusted under 35 U.S.C. 154(b) by 387 days.

(21) Appl. No.: 14/681,169

(22) Filed: Apr. 8, 2015

(65) Prior Publication Data

US 2016/0299500 A1 Oct. 13, 2016

(51) Int. Cl.
*G05B 19/418* (2006.01)

(52) U.S. Cl.
CPC ............. *G05B 19/41875* (2013.01); *G05B 2219/32228* (2013.01); *G05B 2219/45067* (2013.01); *Y02P 90/04* (2015.11); *Y02P 90/22* (2015.11)

(58) Field of Classification Search
CPC ............... G05B 2219/32204; G05B 2219/32212–2219/32214; G05B 2219/32228; G05B 2219/45067; G05B 19/41875; Y02P 90/04; Y02P 90/22
USPC ........................................... 700/110
See application file for complete search history.

(56) References Cited

U.S. PATENT DOCUMENTS

| | | | |
|---|---|---|---|
| 5,117,919 A | | 6/1992 | Borries et al. |
| 5,341,304 A | * | 8/1994 | Sakamoto ............ B62D 65/005 700/110 |
| 6,021,360 A | * | 2/2000 | Barker ............ G05B 19/41865 700/174 |
| 6,324,749 B1 | | 12/2001 | Katsuura et al. |
| 6,772,027 B2 | | 8/2004 | Kurihara |
| 6,801,821 B2 | | 10/2004 | Madden et al. |
| 7,874,057 B1 | | 1/2011 | Richards |
| 8,649,892 B2 | | 2/2014 | Miyazaki et al. |
| 9,644,942 B2 | * | 5/2017 | Nakano ............ B23Q 17/2428 |
| 2002/0051008 A1 | * | 5/2002 | Mathis ............ G05B 19/41805 715/705 |
| 2002/0198618 A1 | * | 12/2002 | Madden ................ B62D 65/02 700/101 |
| 2003/0069660 A1 | * | 4/2003 | Jun ................... G05B 19/4184 700/110 |

(Continued)

*Primary Examiner* — Kenneth M Lo
*Assistant Examiner* — Michael J. Huntley
(74) *Attorney, Agent, or Firm* — Christopher G. Darrow; Darrow Mustafa PC

(57) ABSTRACT

Devices, systems, and methods for dynamic repair of bypassed vehicles are disclosed. Information regarding an abnormality (for example, an incorrectly installed joint) occurring in a vehicle being assembled on an assembly line can be captured and recorded in a database. Following a bypass command, the vehicle can be flagged and released to continue down the assembly line to be repaired at a later time. When a user is ready to repair the vehicle, repair instructions specific to the abnormality can be retrieved from a database and presented to the user, and the repair procedure can be monitored to ensure that the abnormality has been repaired correctly. The vehicle can be unflagged only if all abnormalities in the vehicle have been repaired. The vehicle can be prevented from exiting the last station in the assembly line if it remains flagged.

16 Claims, 4 Drawing Sheets

(56) References Cited

U.S. PATENT DOCUMENTS

| | | | |
|---|---|---|---|
| 2004/0002788 A1* | 1/2004 | Morimoto | B23P 19/001 700/214 |
| 2004/0249606 A1* | 12/2004 | Hoppes | G05B 19/41805 702/183 |
| 2005/0033464 A1* | 2/2005 | Nguyen | G05B 19/41875 700/108 |
| 2008/0319570 A1* | 12/2008 | Van Schoiack | B23P 19/06 700/110 |
| 2010/0256793 A1* | 10/2010 | Lee | G05B 19/41875 700/108 |
| 2011/0093110 A1* | 4/2011 | Stencel | B25B 21/00 700/110 |
| 2011/0178627 A1* | 7/2011 | Wechter | G05B 19/41875 700/109 |
| 2012/0083917 A1* | 4/2012 | Zhou | G05B 13/048 700/110 |
| 2014/0277662 A1* | 9/2014 | Kesler | G05B 19/41875 700/97 |
| 2015/0153732 A1* | 6/2015 | Scelsi | G05B 19/41875 29/430 |
| 2016/0299500 A1* | 10/2016 | Drasovean | G05B 19/41875 |

\* cited by examiner

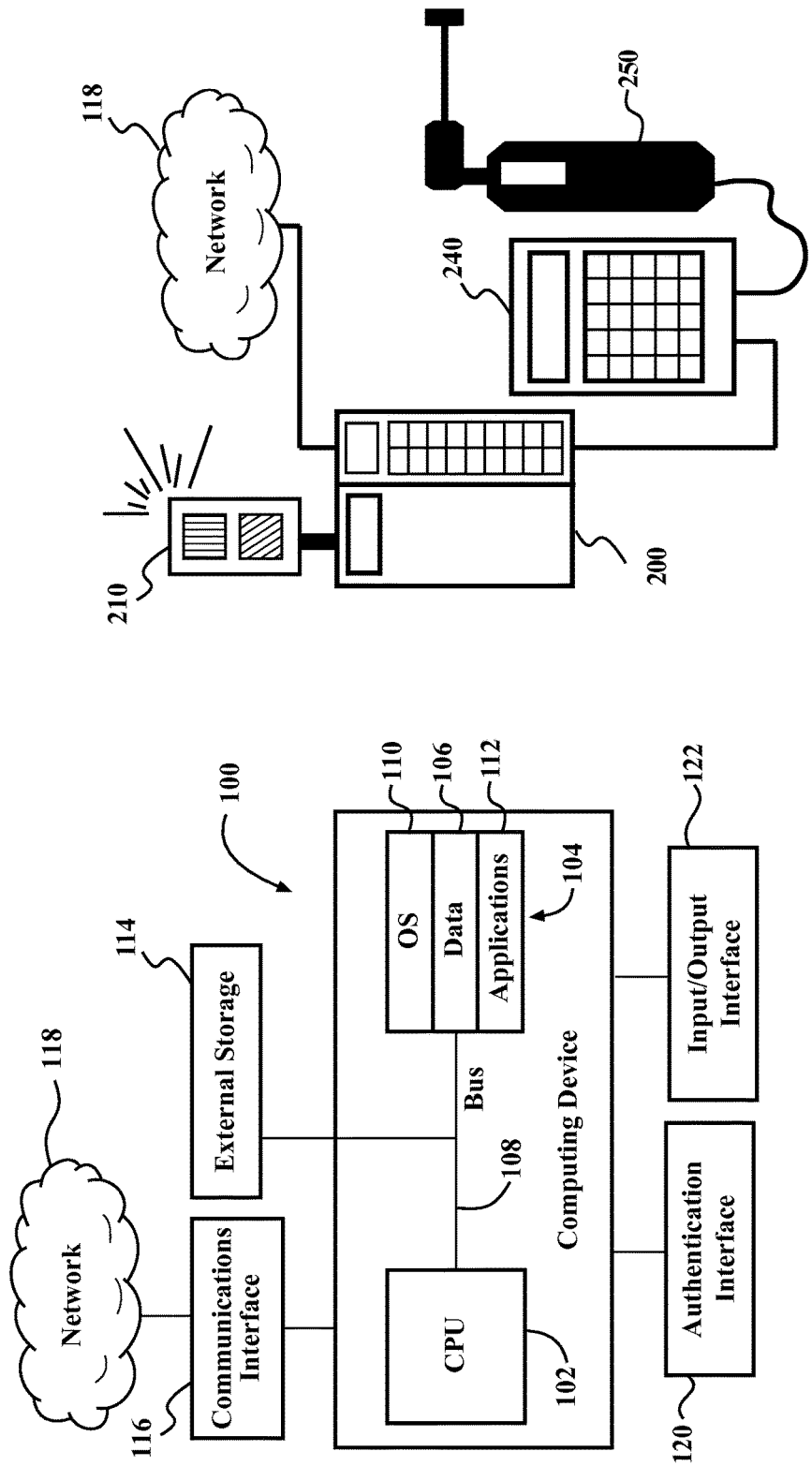

DYNAMIC REPAIR SYSTEM

BACKGROUND

This disclosure generally relates to assembly lines for vehicles and more specifically error-proofing systems thereof. Many automotive assembly plants include error proofing (in Japanese, "pokayoke") systems to maintain quality control as vehicles are assembled on an assembly line. Pokayoke systems typically include controllers stationed at each station of the assembly line, which are used to detect if a process was performed according to predefined standards or thresholds. For example, an assembly process can include a procedure to tighten joints on a vehicle (such as a nut/bolt joint) using an electric or pneumatic nutrunner. During such an assembly process, it is possible that a joint will fail to be tightened at the proper torque or will be tightened at an incorrect angle, which can lead to a cross threaded joint.

Pokayoke controllers are often used to alert users to the existence of these kinds of assembly faults or abnormalities, such as by flashing a light or sounding an alarm, or by causing the assembly line to halt. When this happens, a supervisor is typically called to correct the abnormality. However, there may not be time to correct the abnormality immediately, and so the supervisor will often bypass the pokayoke system by overriding the alarm and restarting the assembly line, intending to repair the vehicle at some point farther down the assembly line.

It is incumbent upon the supervisor issuing the bypass to ensure that the abnormality is eventually corrected. The supervisor must therefore manually keep track of bypassed vehicles throughout the assembly process. However, it is difficult and time consuming for users to accurately record each vehicle and the needed repairs and to later remember all the information necessary to conduct the repair. Therefore, abnormalities in bypassed vehicles are often not tracked effectively and therefore are often not adequately repaired. In addition, because repairs are performed after the vehicle has moved down the assembly line, the tools needed for the repairs are manual tools that are not connected to the pokayoke system.

It has been observed that users tasked with correcting abnormalities such as those described above have been known to: (i) repair the wrong joint, (ii) repair the correct joint on the wrong vehicle, (iii) use an incorrect torque when repairing the joint, (iv) forget to repair the abnormality altogether, and/or (v) fail to log a repair as completed. Thus, due to manual repair tracking, an incorrectly installed joint can remain present after the vehicle is released down the assembly line. Sometimes, even new abnormalities are introduced during the repair process. Additionally, a user may complete a repair but forget to log the repair, negatively impacting traceability and quality control.

SUMMARY

Devices, systems, and methods for dynamic repair of bypassed vehicles are disclosed. Information regarding an abnormality (for example, an incorrectly installed joint) occurring in a vehicle being assembled on an assembly line can be captured and recorded in a database. Following a bypass command, the vehicle can be flagged and released to continue down the assembly line to be repaired at a later time. When a user is ready to repair the vehicle, repair instructions specific to the abnormality can be retrieved from a database and presented to the user, and the repair procedure can be monitored to ensure that the abnormality has been repaired correctly. The vehicle can be unflagged only if all abnormalities in the vehicle have been repaired. The vehicle can be prevented from exiting the last station in the assembly line if it remains flagged.

A computing device for an assembly line is disclosed, comprising: one or more processors for controlling operations of the computing device; and a memory storing data and program instructions used by the one or more processors, wherein the one or more processors are configured to execute instructions stored in the memory to: receive information regarding an abnormality occurring in a vehicle being assembled on the assembly line; flag the vehicle by storing the information regarding the abnormality in a database; monitor a repair of the abnormality; and unflag the vehicle only if the repair of the abnormality is completed successfully.

A method is disclosed, comprising: receiving information regarding an abnormality occurring in a vehicle being assembled on an assembly line; flagging the vehicle by storing the information regarding the abnormality in a database; monitoring a repair of the abnormality; and unflagging the vehicle only if the repair of the abnormality is completed successfully.

A system is disclosed, comprising: a repair tool configured to detect abnormalities in a repair procedure; a computing device comprising: one or more processors for controlling operations of the computing device; and a memory storing data and program instructions used by the one or more processors, wherein the one or more processors are configured to execute instructions stored in the memory to: receive information regarding an abnormality occurring in a vehicle being assembled on an assembly line; flag the vehicle by storing the information regarding the abnormality in a database; monitor a repair of the abnormality; and unflag the vehicle only if the repair of the abnormality is completed successfully.

BRIEF DESCRIPTION OF THE DRAWINGS

FIG. 1 is a schematic block diagram of a computing device for dynamic repair of a vehicle bypassed on an assembly line.

FIG. 2 is a pictorial representation of a pokayoke controller with a nutrunner connected thereto.

DETAILED DESCRIPTION

Figure 3:
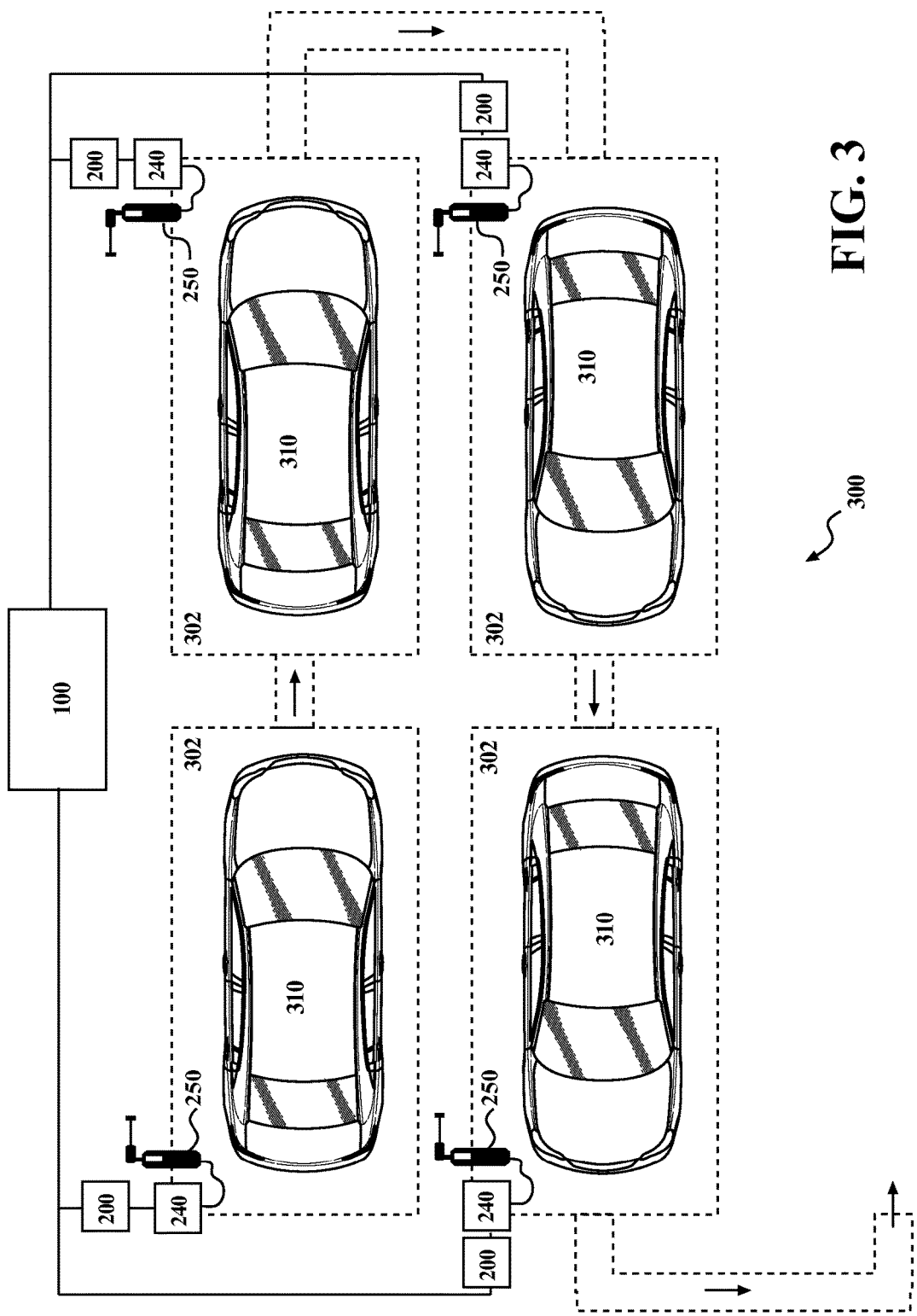
FIG. 3 is a schematic block diagram of an exemplary assembly line employing the computing device of FIG. 1 and the pokayoke controller of FIG. 2.

Disclosed herein are devices, systems, and methods for dynamic repair of bypassed vehicles. Information regarding an abnormality occurring in a vehicle being assembled on an assembly line can be recorded in a database, for example, after a user bypasses a pokayoke system to release the vehicle having an abnormality to be repaired at a later time. The disclosed implementations provide an advantage over existing (prior art) methods, wherein a user must manually log a repair needed after bypassing the pokayoke system and releasing the vehicle down the assembly line. Currently, abnormalities often are not repaired properly. In contrast, the disclosed implementations describe integrating the repair process with an existing pokayoke system, so that abnormalities, bypasses, and repairs are automatically confirmed and recorded, thus improving traceability. Accordingly, the disclosed implementations can provide a superior level of protection against quality flow out.

FIG. 1 is a schematic block diagram of a computing device 100 for dynamic repair of a vehicle bypassed in an assembly line. The computing device 100 can be any type of single computing device (such as a server, desktop, laptop, mobile, or handheld), or can be composed of multiple computing devices. A processing unit in the computing device 100 can be a conventional central processing unit (CPU) 102 or any other type of device, or multiple devices, capable of manipulating or processing information. A memory 104 in the computing device 100 can be a random access memory device (RAM) or any other suitable type of storage device. The memory 104 can include data 106 that is accessed by the CPU 102 using a bus 108.

The memory 104 can also include an operating system 110 and installed applications 112, the installed applications 112 including programs or apps that permit the CPU 102 to implement the dynamic repair features disclosed herein. The computing device 100 can also include secondary, additional, or external storage 114, for example, a memory card, flash drive, or any other form of computer readable medium. In one implementation, the applications 112 can be stored in whole or in part in the external storage 114 and loaded into the memory 104 as needed for processing.

The computing device 100 can be equipped with a communications interface 116 to connect to other devices, either directly or over a network 118 such as a local area network (LAN) or the internet. The communications interface 116 can be configured to transmit and receive data over a cable (such as a CAT5 network cable) or wirelessly (for example, using a protocol such as 802.11 or Bluetooth™). The computing device 100 can also include an authentication interface 120 for identifying authorized users. The authentication interface 120 can include key card readers, biometric scanners, or other devices used to authenticate users as is known in the art. The computing device 100 can also include an input/output interface 122 to connect to devices used to input data into the computing device 100 or to output data to a user. Example devices include keyboards, displays, audio devices such as microphones and speakers, voice recognition interfaces, and similar devices.

FIG. 2 is a pictorial representation of a pokayoke controller 200 in communication with a nutrunner controller 240. The pokayoke controller 200 can be configured to communicate with the computing device 100, for example, over the network 118. The pokayoke controller 200 can be configured to notify users of abnormalities that occur during the assembly process, as described in more detail below. The pokayoke controller 200 can include a notification light 210 to alert users to abnormalities. The notification light 210 can emit colors based on the status of the vehicle—for example, a green light can mean that there are no abnormalities while a red light can mean an abnormality has been detected. Audio alerts can also be used to provide notifications to users.

The nutrunner controller 240 can be configured to control a nutrunner 250 used to perform an assembly procedure on a vehicle, for example, tightening a joint (e.g., a nut or a bolt). The nutrunner controller 240 can set the nutrunner 250 to operate at a predefined torque when tightening the joint. The nutrunner 250 can include sensors to detect whether the joint is tightened correctly or not. For example, the nutrunner 250 can be configured to measure the torque actually applied to the joint (which may at times vary from the desired torque set by the nutrunner controller 240) and/or the angle of rotation. The nutrunner controller 240 can compare the measurements detected by the nutrunner 250 to predefined acceptable ranges to determine if the assembly procedure was completed successfully or if a fault or abnormality occurred during operation.

FIG. 3 is a schematic block diagram of an exemplary assembly line 300 employing the computing device 100 of FIG. 1 and the pokayoke controller 200 of FIG. 2 (along with the connected nutrunner controller 240 and nutrunner 250). The assembly line 300 can include several stations 302 for assembling one or more vehicles 310. At each station 302, a user can be tasked with performing a particular assembly procedure on the vehicle 310, for example, tightening joints using the nutrunner 250 available at such station 302. Each station 302 can be equipped with a pokayoke controller 200 to notify the user whether the process performed has been completed successfully. The pokayoke controllers 200 can be connected to the network 118 in order to communicate with the computing device 100.

Abnormalities can and do occasionally occur during assembly, even when the correct torque is programmed into the nutrunner 250. For example, a joint may fail to be tightened to the proper torque, or it can be torqued at an incorrect angle causing the bolt to become cross threaded. The nutrunner controller 240 can be configured to determine if such an abnormality has occurred based on the data detected by the nutrunner 250. In a typical scenario, where no abnormality occurs, after the assembly procedure of each station 302 is complete, the vehicle 310 is released to the next station 302 in the assembly line 300. However, if an abnormality is detected, the pokayoke controller 200 can be configured to cause the assembly line 300 to halt with a "line stop" operation so that a repair can be made to correct the abnormality. The pokayoke controller 200 can also be configured to alert users to the problem, for example, by flashing the notification light 210.

Certain authorized users such as supervisors can be permitted to override the pokayoke system with a bypass command. This can reset the pokayoke controller 200 and restart the assembly line 300, thereby releasing the bypassed vehicle 310 to the next station 302. The authorized user can input the bypass command into the pokayoke controller 200. The pokayoke controller 200 can then provide the bypass command and other information regarding the abnormality to the computing device 100.

In one exemplary implementation, the user must be authenticated before being permitted to issue a bypass command. The authentication process can include the user scanning a keycard identifying the user as an authorized user. In one exemplary implementation, the keycard scanner can be integrated into the pokayoke controller 200 installed at each station 302. The pokayoke controller 200 can send the keycard information to the computing device 100, which can authenticate the authorized user using the authentication interface 120. Upon authenticating the user, the computing device 100 can authorize the bypass, which will reset the pokayoke controller 200 and restart the assembly line 300). Other authentication methods can also be used without departing from the spirit and scope of this disclosure; for example, biometric data (e.g., fingerprints, retina scans, etc.) can be used to authenticate the user rather than keycards.

Upon receiving notice of the abnormality and/or bypass command from the pokayoke controller 200 (and assuming the authorized user is authenticated), the computing device 100 can record information regarding the abnormality in a database, for example, stored in the memory 104 or external storage 114. This information can include information identifying the vehicle 310 that is subject to the abnormality and the station 302 at which the abnormality occurred. The information recorded in the database can also include other details such as the date and time of the abnormality and/or bypass command, the name/badge number of the user working on the vehicle and/or the authorized user that entered the bypass command, etc. The information regarding the abnormality recorded in the database can be used to track the vehicle 310 having the abnormality and the progress of the repair, as described in more detail below.

Figure 4:
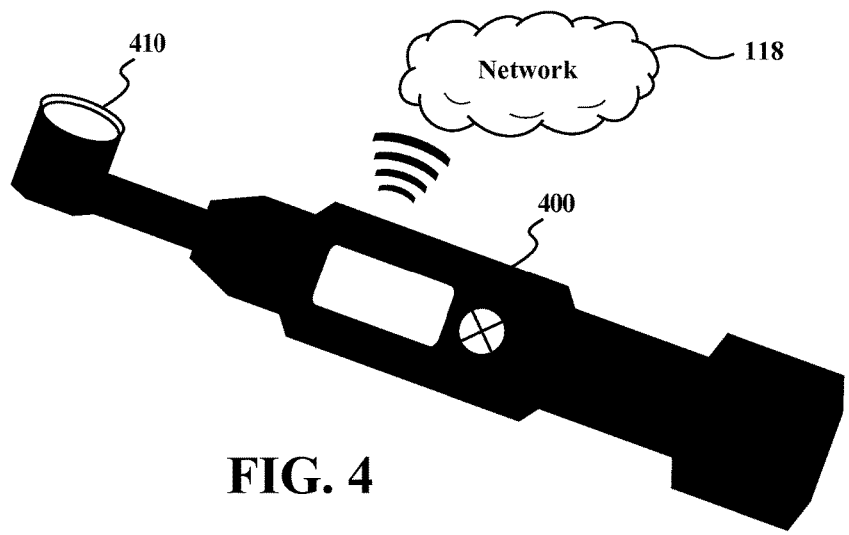
FIG. 4 is a pictorial representation of a repair tool configured to communicate with the computing device.

FIG. 4 is a pictorial representation of a repair tool 400 used to repair the vehicle 310. As discussed above, by issuing a bypass command, the authorized user can cause the vehicle 310 to be released to continue down the assembly line 300 while at the same time causing the computing device 100 to record the information regarding the abnormality in the database. The vehicle 310 can then be repaired using the repair tool 400 by a user (who may be the same user or another user) at a later time, when the vehicle 310 is at any subsequent station 302 in the assembly line 300.

One example repair tool 400 is a smart wrench configured to communicate with the computing device 100, for example by connecting wirelessly to the network 118. The wireless connection can allow the user of the repair tool 400 to carry it anywhere in the assembly line 300 in order to repair abnormalities wherever the vehicle 310 may be located. Like the nutrunner 250, the repair tool 400 can include sensors that can detect the torque and angle of rotation applied when the repair tool 400 is used to tighten joints during the repair.

The repair tool 400 can also include an integrated barcode scanner to scan a barcode disposed on the vehicle 310. The barcode information (representing a unique identifier for each respective vehicle 310) can be sent to the computing device 100 to provide confirmation that the user is ready to perform a repair procedure on that particular vehicle 310. Thus, receiving the barcode information can cause the computing device 100 to retrieve information relating to the vehicle 310 and the abnormality and repair instructions, and begin monitoring the repair procedure. Alternatively, a stand-alone barcode scanner in communication with the computing device 100 can be used to deliver barcode information to the computing device 100. Other identifying tags can be disposed on the vehicle 310 instead of a barcode (for example, a near-field communication (NFC) tag) and read by an appropriate reader/scanner in communication with the computing device 100 without departing from the spirit or scope of this disclosure.

Figure 5:
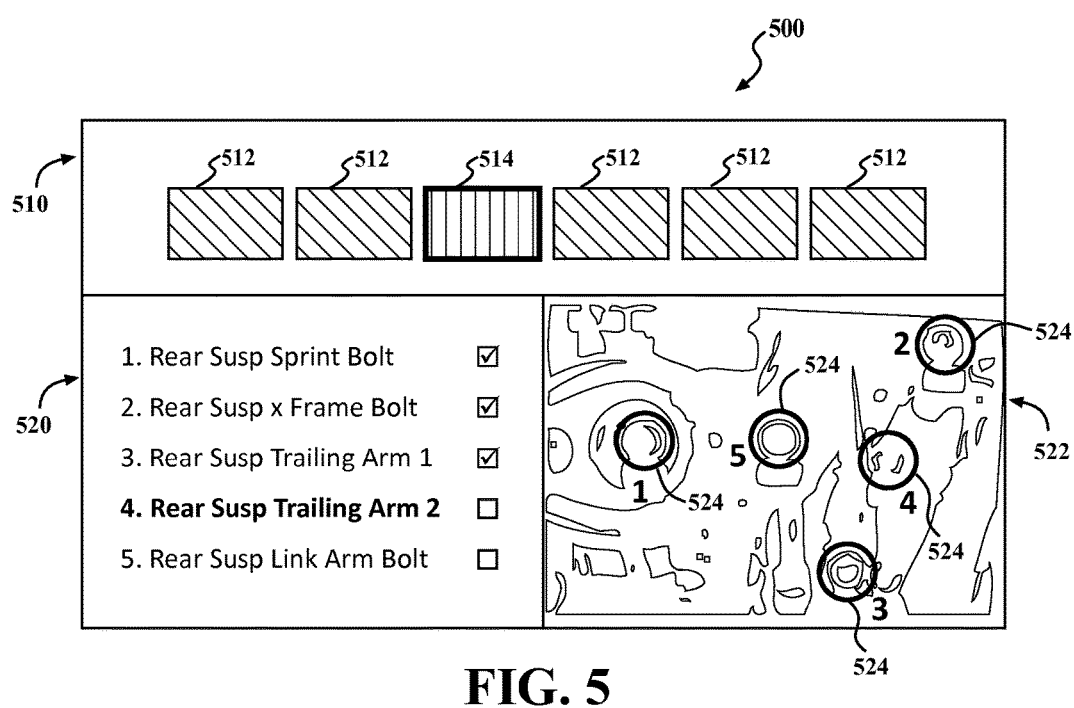
FIG. 5 is a pictorial representation of a display showing repair instructions.

FIG. 5 is a pictorial representations of a display 500 controlled by the computing device 100, for example, via the input/output interface 122. The display 500 can be a stand-alone computer monitor, or it can be a screen integrated into the repair tool 400 or the user's mobile device. In general, any device capable of displaying images can be used without departing from the spirit or scope of this disclosure. In addition, the information provided to the user as disclosed here can be presented in a different format, such as audio, without departing from the spirit or scope of this disclosure.

The display can be used to show an assembly line view 510, which can include icons to represent the vehicles 310 that are currently located at each of the stations 302 on the assembly line 300. The assembly line view 510 can show whether a vehicle 310 is flagged (i.e., has a detected abnormality) or unflagged (does not have a detected abnormality). For example, unflagged vehicles 310 can be represented with a green icon 512 while flagged vehicles 310 can be represented with a red icon 514. In this way, the user can see at a glance where in the assembly line 300 the vehicles 310 that requires repair are currently located.

Repair instructions 520 can be shown on the display 500 to assist users with repairing abnormalities. When the user scans the barcode on the vehicle 310 to be repaired, the computing device 100 can display instructions specific to the relevant repair. In one exemplary implementation, when the computing device 100 receives a notification of a barcode scan, the computing device 100 can identify the vehicle 310 to be repaired and retrieve, from the database, the information regarding the abnormality associated with that vehicle 310. Repair instructions 520 can be specific for each station 302 and based on the assembly process of that station 302. The repair instructions 520 can be stored in a database (which can be but need not be the same database storing the information regarding the abnormality, discussed above) and retrieved to present to the user on the display 500.

The display 500 can also display a diagram 522 containing joint labels 524 showing the user where the joints that need repair are located on the vehicle 310 and the proper sequence of how to tighten the joints (for example, the assembly process in which the abnormality occurred could have included tightening five joints in a particular sequence). The diagram 522 can also consist of a photograph, three-dimensional model, or other type of visual model.

The repair tool 400 can be configured to determine whether a joint is tightened correctly based on the torque and angle data that it captures with its sensors. For every joint that the user tightens using the repair tool 400, the repair tool 400 can communicate to the computing device 100 whether the joint was tightened correctly or not. For example, the repair tool 400 can send either an OK message or an error message. If the computing device 100 receives an OK message from the repair tool 400, it can update the display 500 to show the progress of the repair. For example, the computing device 100 can check off steps in the repair instructions 520 that are completed and/or can change the color of a completed instruction step from red to green. FIG. 5 illustrates an exemplary scenario in which three out of five joints have already been successfully tightened and two joints remain to be tightened. The joint labels 524 on the diagram 522 can also be used to show which steps have been completed and which steps remain, for example by changing color from red to green. On the other hand, if the repair tool 400 detects an abnormality while tightening a joint (e.g., the wrong torque or a cross threading), the repair tool 400 can send an error indication to the computing device 100 which can cause the display 500 to show an error message.

In another exemplary implementation, the repair tool 400 can send raw data captured by its sensors regarding torque and angle rotation to the computing device 100, and the determination whether an abnormality occurred can be made by the computing device 100 (rather than the repair tool 400 making the determination and sending an OK message or an error message to the computing device 100). Other similar adaptations can be made without departing from the spirit or scope of the disclosure.

When the user has successfully completed the repair, the computing device 100 can display a message informing the user. In addition, the icon representing that vehicle 310 in the assembly line view 510 can change back from a red icon 514 to a green icon 512, indicating that the vehicle 310 no longer requires repair. The computing device 100 can also remove the flag associated with the vehicle 310 in the database.

Turning back to FIG. 4, the repair tool 400 can be configured to operate using a variety of different attachment heads 410. In some cases, if an assembly process (and the corresponding repair process) includes tightening several joints, it is possible that not all the joints will need the same amount of torque. In fact, using current, manual tracking methods, errors and uncorrected abnormalities are frequently found in such cases because the users performing repairs may get confused and fail to remember the proper torque for each joint. The disclosed implementations can minimize these errors. In one exemplary implementation, each attachment head 410 can be configured to cause the repair tool 400 to operate at a different torque. The repair tool 400 and the various attachment heads 410 can be configured with to communicate with each other via a short-range communication protocol such as near-field communication (NFC), Bluetooth™, or similar protocol. The repair tool 400 can notify the computing device 100 of the attachment head 410 that is currently attached. During a repair, the computing device 100 can determine, based on the repair instructions 520 and the specific joint that is to be tightened next, whether the correct attachment head 410 is attached to tighten the joint at the appropriate torque. If the attachment head 410 does not match the torque requirements of the joint to be tightened, then the repair tool 400 can be prevented from operating until the correct attachment head 410 is applied. The computing device 100 can cause the display 500 to display a message instructing the user to connect the appropriate attachment head 410 each time a different torque is needed.

The computing device 100 can also prevent the repair tool 400 from operating if the computing device 100 receives a barcode scan of a vehicle 310 which does not have any abnormality. This can ensure that the user does not inadvertently introduce an unneeded repair and potentially a new abnormality to a vehicle 310 that is already in suitable condition. In such a case, the computing device 100 can use the display 500 to show an error message to notify the user that the wrong vehicle 310 was scanned.

When the vehicle 310 reaches the end of the assembly line 300, a check can be performed as to whether the vehicle 310 is still flagged (indicating that the abnormality has not yet been repaired) or whether the flag has been removed. If there is no longer a flag associated with the vehicle 310, then the computing device 100 can allow the vehicle 310 to exit the assembly line 300. On the other hand, if the vehicle 310 is still flagged, the computing device 100 can automatically generate a line stop command and/or issue an alert (such as by sounding an alarm or displaying an error message) indicating that the abnormality is still present in the vehicle 310. The vehicle 310 can then be corrected at that point. A pokayoke controller 200 can be specially configured for the last station 302 of the assembly line 300 to implement this check and prevent the flagged vehicle 310 from exiting the assembly line 300.

Figure 6:
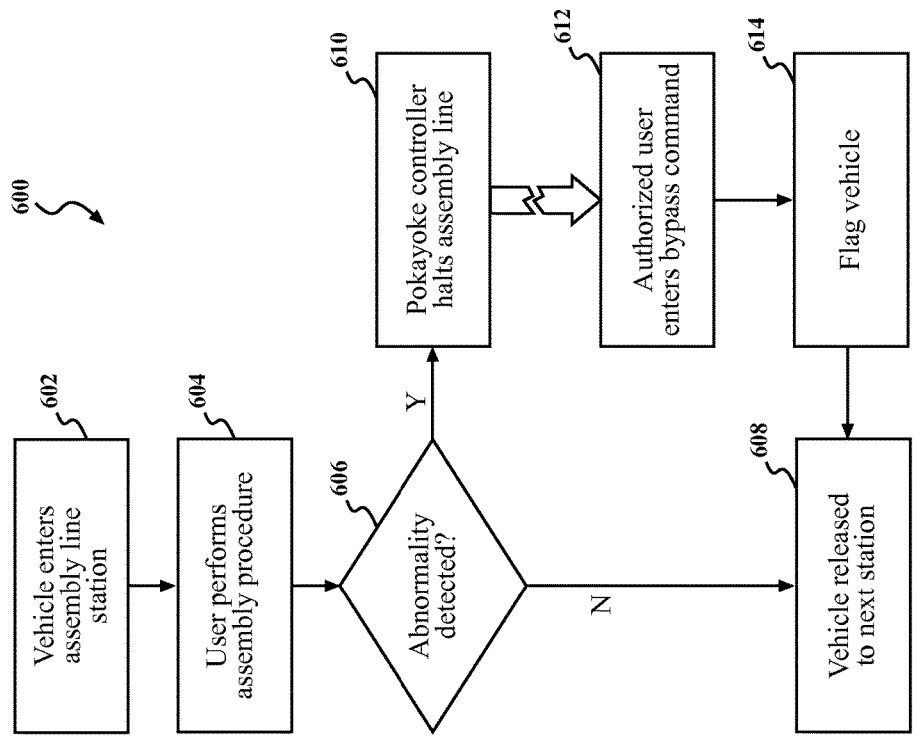
FIG. 6 is a logic flowchart of an example process for detecting an abnormality on a vehicle on an assembly line.

FIG. 6 is a logic flowchart of an example process 600 for detecting an abnormality on the vehicle 310. At step 602, the vehicle 310 enters a station 302 on the assembly line 300 for an assembly procedure, for example to tighten joints. At step 604, a user can use the nutrunner 250 to tighten the joints. As the nutrunner 250 tightens the joints, the attached nutrunner controller 240 can send torque data to the pokayoke controller 200. At step 606, a determination can be made, based on the data received from sensors on the nutrunner 250, whether an abnormality is detected. If no, then at step 608, the vehicle 310 can be released to the next station 302 in the assembly line 300. If yes, then at step 610, the pokayoke controller 200 can generate a line stop, which can halt the entire assembly line. If a line stop has been generated, a bypass command may be entered, for example, by an authorized user. At step 612, the computing device 100 receives the bypass command entered by the authorized user. At step 614, the computing device 100 can store information regarding the abnormality in a database including a flag associated with the vehicle 310 and bypass information. This information regarding the abnormality can be retrieved by the computing device 100 when the vehicle 310 is to be repaired. The process 600 can then return to step 608, where the vehicle 310 can be released to the next station 302 in the assembly line 300.

Figure 7:
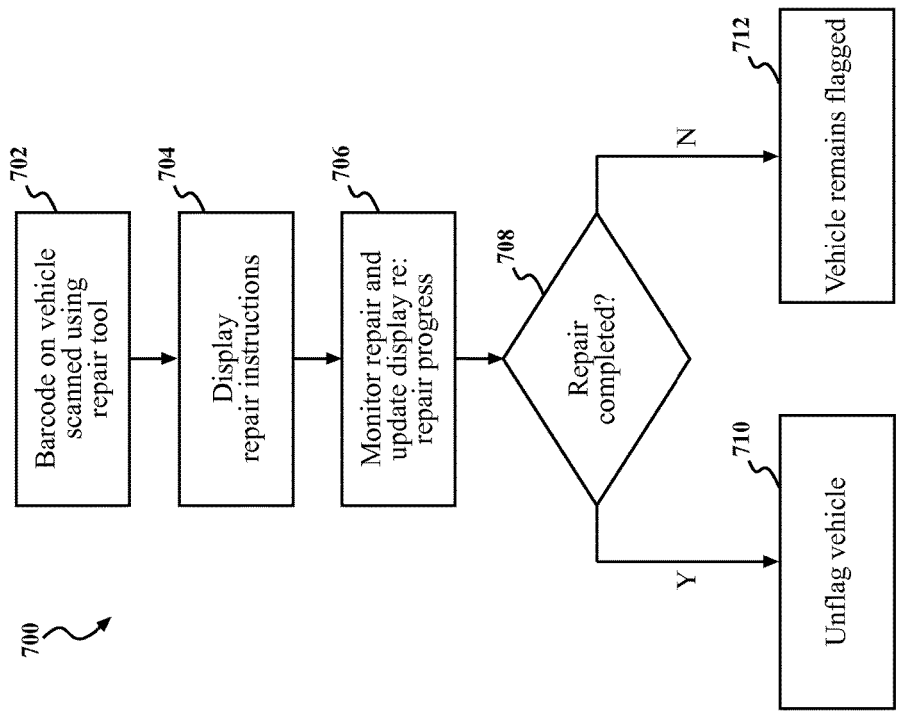
FIG. 7 is a logic flowchart of an example process for repairing an abnormality for a bypassed vehicle.

FIG. 7 is a logic flowchart of an example process 700 for repairing an abnormality on the vehicle 310. As described above, the vehicle 310 has been subject to a bypass command and flagged. At step 702, a user scans the barcode of the vehicle 310 (for example, using a barcode scanner integrated into the repair tool 400). At step 704, the user is presented with the repair instructions 520, for example, using the display 500. At step 706, the user performs the repair procedure, for example, to retighten the joints using the repair tool 400. The computing device 100 can monitor the progress of the repair by the status messages received from the repair tool 400 after each joint is tightened. Each time the computing device 100 receives an indication of a successful joint tightening, the computing device 100 can update the display 500 to show the progress of the repair and show which steps of the repair instructions 520 have been completed and which remain. At step 708, the computing device 100 determines whether all elements of the repair have been completed. If yes, then at step 710, the flag assigned to the vehicle 310 can be removed, in which case the icon representing the vehicle 310 in the assembly line view 510 can also be modified to indicate that there is no flag (for example, such change can be indicated by color). If the repair has not been successfully completed, then, at step 712, the vehicle 310 can remain flagged. Appropriate measures can be taken as warranted. For example, the user can be notified via the display 500 that abnormalities remain. In addition, the vehicle 310 can be prevented from exiting the final station 302 in the assembly line 300 or from obtaining final approval so long as the vehicle 310 remains flagged.

The foregoing description relates to what are presently considered to be the most practical embodiments. It is to be understood, however, that the disclosure is not to be limited to these embodiments but, on the contrary, is intended to cover various modifications and equivalent arrangements included within the spirit and scope of the appended claims. For example, the user who enters the bypass command for the vehicle 310 and the user who repairs the vehicle 310 may or may not be the same individual. In general, any portion of the disclosed devices, systems, and methods can be performed by any user without departing from the spirit and scope of the appended claims, including different users for different portions. In addition, the computing device 100 can be embodied in a single computer such as a server, or the instructions can be distributed among several machines (for example, several pokayoke controllers 200 having processing capabilities), which collectively are to be deemed the computing device 100 for the purpose of this disclosure. In addition, while the exemplary implementations disclosed here generally relate to tightening and torqueing procedures, the disclosed implementations can equally apply to other assembly procedures using tools appropriate for such procedures. The scope of the claims is thus to be accorded the broadest interpretation so as to encompass all such modifications and equivalent structures as is permitted under the law.

What is claimed is:

1. A computing device for an assembly line comprising:
one or more processors for controlling operations of the computing device; and
a memory storing data and program instructions used by the one or more processors, wherein the one or more processors are configured to execute instructions stored in the memory to:
receive information regarding an abnormality occurring in a vehicle being assembled on the assembly line;
flag the vehicle by storing the information regarding the abnormality in a database;
if the vehicle is flagged when it reaches a subsequent station along the assembly line, cause repair instructions to be displayed to a user of a repair tool located at the subsequent station in response to a user scanning an identifying tag disposed on the vehicle using an identifying tag scanner, the repair tool being in communication with the one or more processors;
prevent the repair tool from operating if the repair tool is not suitable for the repair of the abnormality;
monitor a repair of the abnormality using repair data received from the repair tool;
cause the displayed repair instructions to be updated based on the repair data received from the repair tool;
unflag the vehicle only if the repair of the abnormality is completed successfully;
if the vehicle is not flagged when it reaches the subsequent station, prevent the repair tool from operating, whereby the vehicle does not have an abnormality; and
prevent the vehicle from exiting the assembly line if the vehicle is flagged.

2. The computing device of claim 1, wherein the information regarding the abnormality is received from a pokayoke controller.

3. The computing device of claim 1, wherein the abnormality is an incorrectly installed joint.

4. The computing device of claim 1, wherein the information regarding the abnormality includes information regarding a bypass command entered by an authorized user.

5. The computing device of claim 1, wherein monitoring the repair of the abnormality is caused by receiving information regarding a barcode associated with the vehicle.

6. The computing device of claim 1, wherein the identifying tag is a barcode, and wherein the identifying tag scanner is a barcode scanner.

7. The computing device of claim 6, wherein the barcode scanner is integrated into the repair tool.

8. The computing device of claim 6, wherein the barcode scanner is a stand-alone barcode scanner in communication with the computing device.

9. A method comprising:
receiving information regarding an abnormality occurring in a vehicle being assembled on an assembly line;
flagging the vehicle by storing the information regarding the abnormality in a database;
when the flagged vehicle reaches a subsequent station along the assembly line, causing repair instructions to be displayed a user of a repair tool located at the subsequent station in response to a user scanning an identifying tag disposed on the vehicle;
preventing the repair tool from operating if the repair tool is not suitable for the repair of the abnormality;
monitoring a repair of the abnormality using repair data received from the repair tool;
causing the displayed repair instructions to be updated based on the repair data received from the repair tool;
unflagging the vehicle only if the repair of the abnormality is completed successfully; and
preventing the vehicle from exiting the assembly line if the vehicle is flagged.

10. The method of claim 9, wherein, if the vehicle is unflagged when it reaches a station along the assembly line, preventing a repair tool at the station from operating.

11. The method of claim 9, wherein the information regarding the abnormality is received from a pokayoke controller.

12. The method of claim 9, wherein the abnormality is an incorrectly installed joint.

13. The method of claim 9, wherein the information regarding the abnormality includes information regarding a bypass command entered by an authorized user.

14. The method of claim 9, wherein monitoring the repair of the abnormality is caused by receiving information regarding a barcode associated with the vehicle.

15. A system comprising:
a display located at a station located along an assembly line;
a repair tool configured to detect abnormalities in a repair procedure, the repair tool being located at the station;
a computing device operatively connected to the repair tool and to the display, the computing device comprising: one or more processors for controlling operations of the computing device; and a memory storing data and program instructions used by the one or more processors, wherein the one or more processors are configured to execute instructions stored in the memory to:
receive information regarding an abnormality occurring in a vehicle being assembled on the assembly line;
flag the vehicle by storing the information regarding the abnormality in a database;
monitor a repair of the abnormality, the repair being performed using the repair tool;
prevent the repair tool from operating if the repair tool is not suitable for the repair of the abnormality;
unflag the vehicle only if the repair of the abnormality is completed successfully;
prevent the repair tool from operating if the vehicle is not flagged, whereby the vehicle does not have an abnormality;
prevent the vehicle from exiting the assembly line if the vehicle is flagged; and
cause an assembly line view to be presented on the display, the assembly line view including an icon representing a vehicle currently located at each station on the assembly line, the icons for flagged vehicles being presented in a first color, the icons for unflagged vehicles being presented in a second color that is different than the first color, whereby assembly line operators can see at a glance where in the assembly line the vehicles that require repair are currently located.

16. The system of claim 15, wherein monitoring the repair of the abnormality is caused by receiving an indication that a user is ready to repair the abnormality.

\* \* \* \* \*